US005227640A

United States Patent [19]

Nomura et al.

[11] Patent Number: 5,227,640

[45] Date of Patent: Jul. 13, 1993

[54] APPARATUS FOR DETECTING A FLAME USING WEIGHTED TIME INTERVALS

[75] Inventors: Shintaro Nomura; Katsuhiro Akimoto, both of Tokyo, Japan

[73] Assignee: Nittan Company, Ltd., Tokyo, Japan

[21] Appl. No.: 897,364

[22] Filed: Jun. 11, 1992

[30] Foreign Application Priority Data

Jun. 15, 1991 [JP] Japan .................................. 3-170551
Sep. 5, 1991 [JP] Japan .................................. 3-254657

[51] Int. Cl.[5] .................................. G01J 31/14

[52] U.S. Cl. .................................. 250/554; 250/372; 340/578

[58] Field of Search ............... 250/554, 372, 340, 341; 340/578; 356/315

[56] References Cited

U.S. PATENT DOCUMENTS 4,280,184 7/1981 Weiner et al. ...................... 250/554
4,679,156 7/1987 Kert et al. .
4,736,105 4/1988 Fonnesbeck ........................ 250/372

FOREIGN PATENT DOCUMENTS 150766 1/1988 Japan .

*Primary Examiner*—David C. Nelms
*Assistant Examiner*—Que T. Le
*Attorney, Agent, or Firm*—Ostrager, Chong & Flaherty

[57] ABSTRACT

In a flame detecting apparatus for detecting the flame of fire or the like using a sensor 1, a signal processing unit 3 includes a span counting section 5 for dividing a time base into several time spans, each having a predetermined time interval, and counting the number of signals output from the sensor 1 as a count value for each span, a count value storage section 6 for storing the count value for each span output from the span counting section 5, and an calculation section 7 for judging the occurrence of flame by taking into account the count values counted for the past spans which have been stored in the count value storage section 6, as well as the count value of the latest span, when the count value of the latest span is output from the span counting section 5. Because the flame occurrence judgment is preformed by taking into consideration the accumulated values of the preceding spans together with the accumulated value of the latest span, not only strong flame of short duration but also weak flame of short duration can accurately be detected.

9 Claims, 19 Drawing Sheets

APPARATUS FOR DETECTING A FLAME USING WEIGHTED TIME INTERVALS

BACKGROUND OF THE INVENTION

The present invention relates to a flame detecting apparatus for detecting the flame of a fire and the like using a sensor.

Conventionally, a flame detecting apparatus for detecting flames has been known in which the ultraviolet rays (with wavelength of 180 nm to 260 nm) from the flame are sensed by an ultraviolet sensor (for example, ultraviolet detection tube), and the occurence of flame is detected when the number of discharge pulses for a predetermined period output from the ultraviolet sensor exceeds a specified level.

FIG. 19 shows a block diagram of this kind of flame detecting apparatus. Referring to FIG. 19 , this flame detecting apparatus is provided with an ultraviolet sensor 71, a sensitivity adjustment unit 72 for applying voltage to the ultraviolet sensor 71, a signal processing unit for judging whether or not the number of discharge pulses for a predetermined period exceeds a specified level, and an output unit 75 for outputting a message that there is fire or the like when the number of discharge pulses for a predetermined period exceeds a specified level. These elements of the apparatus are mounted on one circuit board forming a unit.

Incidentally, the condition of the flames of a fire is changed by a combustion state, environmental influences, etc. For example, strong flame may occur for a short period of time, or weak flame may occur for a long period of time.

In the conventional flame detecting apparatus mentioned above, the counting period can be set to an arbitrary value, however, this conventional flame detecting apparatus encounters a problem in that when the counting period is set to be short, strong flames can be detected at an early stage, but weak flames occurring for a long time fail to be detected.

While, when the counting period is set to be long, weak flames occurring for a long time can be detected, but strong flames cannot be detected in the early stages. Moreover, when the counting period is set to be long, influences from noise, etc. are easily received, and the frequency of erroneous detection of flame is higher.

Furthermore, in the conventional flame detecting apparatus, the sensitivity rank of the ultraviolet sensor 71, which is used in the apparatus, was adapted to be tested with a specific testing device in the assembly and manufacture of this flame detecting apparatus as a unit on the circuit board, and based on the test results, it was necessary to perform an evaluation of the quality, sensitivity adjustment, functional check and so on. Therefore, there is another problem in the conventional apparatus in that the testing process using the specific testing device, which is separate from the flame detecting apparatus, causes the assembly or manufacturing process to be too complicated, and makes it impossible to accurately adjust, inspect or test the whole apparatus in the assembly factory.

In addition, after the assembled flame detecting apparatus has been installed in a predetermined installation location to be used as a fire alarm, etc., it needs general periodic inspection to test whether or not the apparatus is operating normally. This periodic inspection or testing has conventionally been conducted by, for example, removing the apparatus from the installation location, and either returning it to the assembly factory for inspection or testing, or by bringing a separate testing device to the installation location and testing the apparatus with a testing device similar to that used during assembly. Based on the results of this inspection, the sensitivity was adjusted and the functions were checked, thus completing the periodic inspection and testing of the flame detecting apparatus.

Therefore, in performing periodic inspection or testing of the flame detecting apparatus at the installation site, or when the apparatus malfunctions, it is necessary to remove the flame detecting apparatus from the site, and to inspect or test it with the specific testing device, which makes inspection or testing of the apparatus too difficult.

SUMMARY OF THE INVENTION

Accordingly, an object of the present invention is to provide a flame detecting apparatus in which the adjustment, inspection, testing, diagnosis and so on of the entire apparatus can be conducted in an easy and accurate manner at either the assembly site or the installation site.

Another object of the present invention is to provide a flame detecting apparatus in which flames can be detected accurately and at an early stage, even when the condition of the flames changes due to the combustion state, environmental influences and the like.

To this end, in accordance with the present invention, there is provided a flame detecting apparatus comprising: an accumulating means for dividing a time base into several time spans, each having a specified time interval, and for accumulating signals output from a sensor for each span, and a calculation means for judging the occurrence of flame by taking into consideration the accumulated values of previous spans, as well as the accumulated value of the latest span found by the accumulating means.

There is further provided a flame detecting apparatus comprising: an accumulating means for accumulating signals output from a sensor, a time counting means for counting the time that elapses from the time that said accumulating means starts accumulating, a span setting means for setting a specified time span corresponding to each one of predetermined threshold levels which are pre-set for the accumulated values of the signals, and a calculation means for comparing the the time counted by said time counting means, when the accumulated value reaches a certain threshold level, with the time span corresponding to the threshold level, and judging whether flame has occurred based on the comparison result.

There is further provided a flame detecting apparatus comprising: an ultraviolet sensor, an adjustment means for adjusting the sensitivity of the said ultraviolet sensor, a signal processing means for processing specified signals based on the number of discharge pulses per a specified time output from said ultraviolet sensor, and an output means for outputting the process results of said signal processing means, wherein said signal processing means detects flame based on the number of discharge pulses per a specified time as well as determines the sensitivity of said ultraviolet sensor.

The above and other objects, features and advantages of the present invention will become more apparent from the following detailed description of the invention when read in conjunction with the accompanying drawings.

DESCRIPTION OF THE PREFERRED EMBODIMENTS

Figure 1:
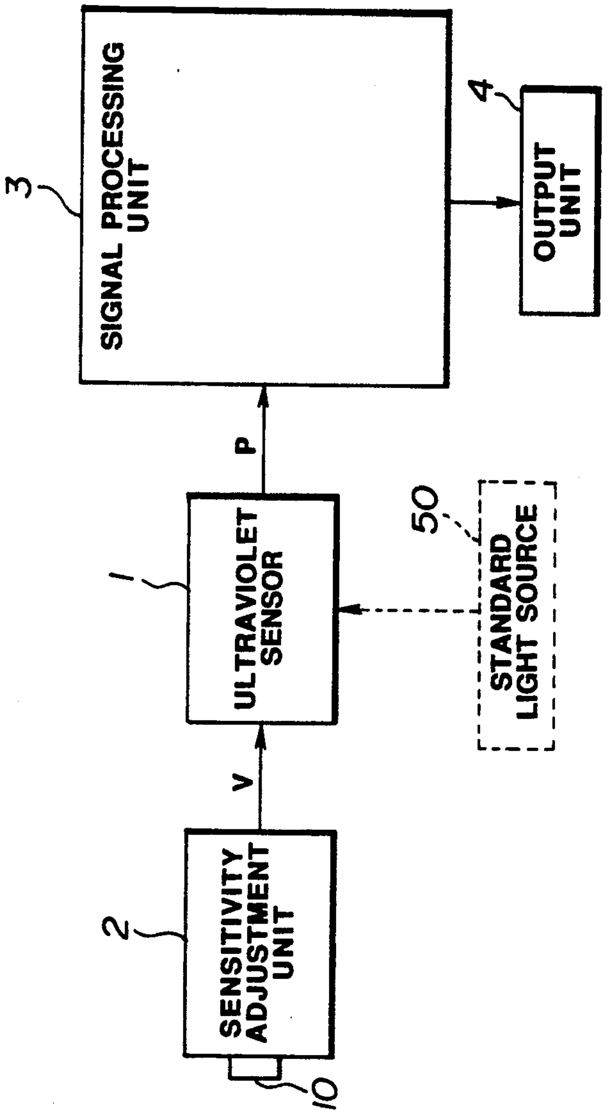
FIG. 1 is a block diagram of an embodiment of the flame detecting apparatus of the present invention.

Referring now to the accompanying drawings, a description will be given of the preferred embodiments of the present invention. In FIG. 1, a flame detecting apparatus is provided with an ultraviolet sensor 1 (ultraviolet detection tube) which detects ultraviolet rays with wavelength of 180 nm to 260 nm radiated from flame and outputs a number of discharge pulses proportional to the quantity of radiation of the ultraviolet rays, a sensitivity adjustment unit 2 for adjusting the sensitivity of the ultraviolet sensor 1, a signal processing unit 3 which has a function for detecting the occurrence of flame based on the discharge pulses output from the ultraviolet sensor 1 when it is irradiated with ultraviolet rays, and an output unit 4 for outputting alarms, displays and the like when the occurrence of flame is detected. These elements of the apparatus are mounted on one circuit board forming a unit. The sensitivity adjustment unit 2 includes an adjustment section 10 (ex. volume adjustment) for adjusting the voltage V applied to the ultraviolet sensor 1, which allows the sensitivity of the ultraviolet sensor 1 to be adjusted.

Figure 2:
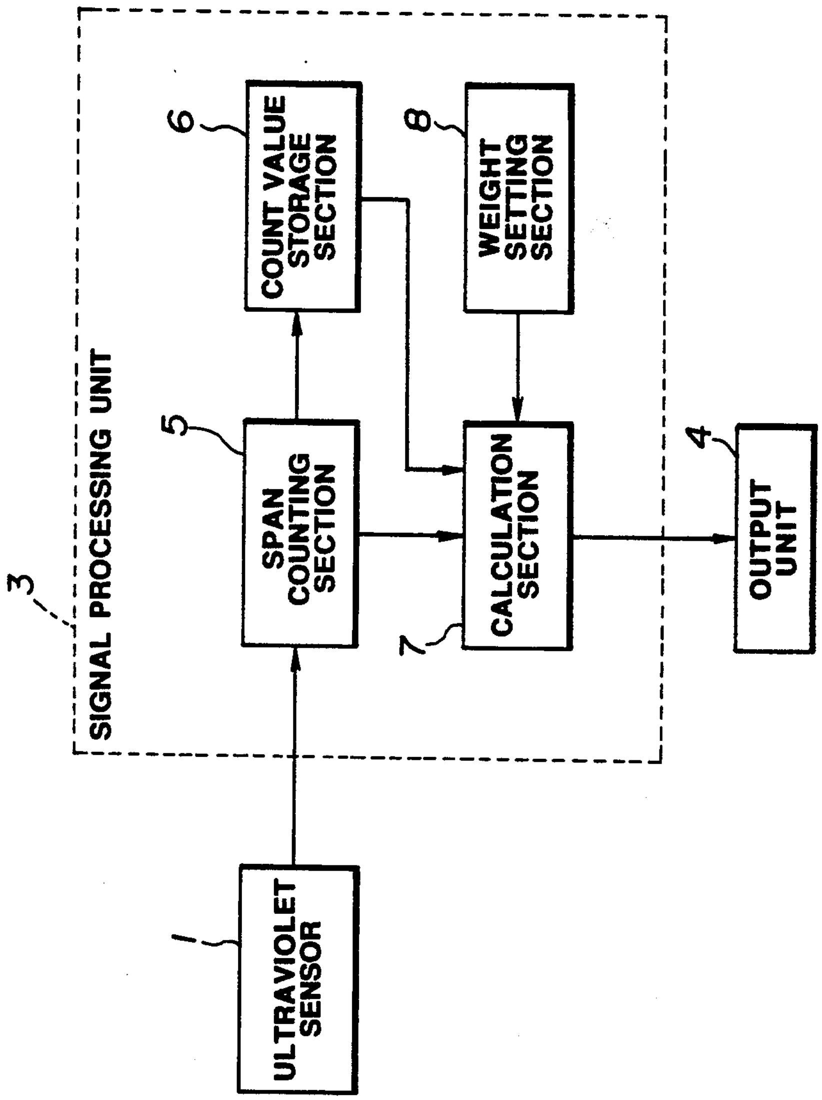
FIG. 2 shows a first example of the signal processing unit.

FIG. 2 is a block diagram showing a first example of the signal processing unit 3. The signal processing unit 3 of FIG. 2 includes a span counting section 5 for dividing a time base into several time spans, each having a predetermined time interval, and counting the number of discharge pulses from the ultraviolet sensor 1 as a count value for each span, a count value storage section 6 for storing the count value for each span output from the span counting section 5, and an calculation section 7 for judging the occurrence of flame by taking into account the count values counted for the past spans which have been stored in the count value storage section 6, as well as the count value of the latest span, when the count value of the latest span is output from the span counting section 5.

Figure 3:
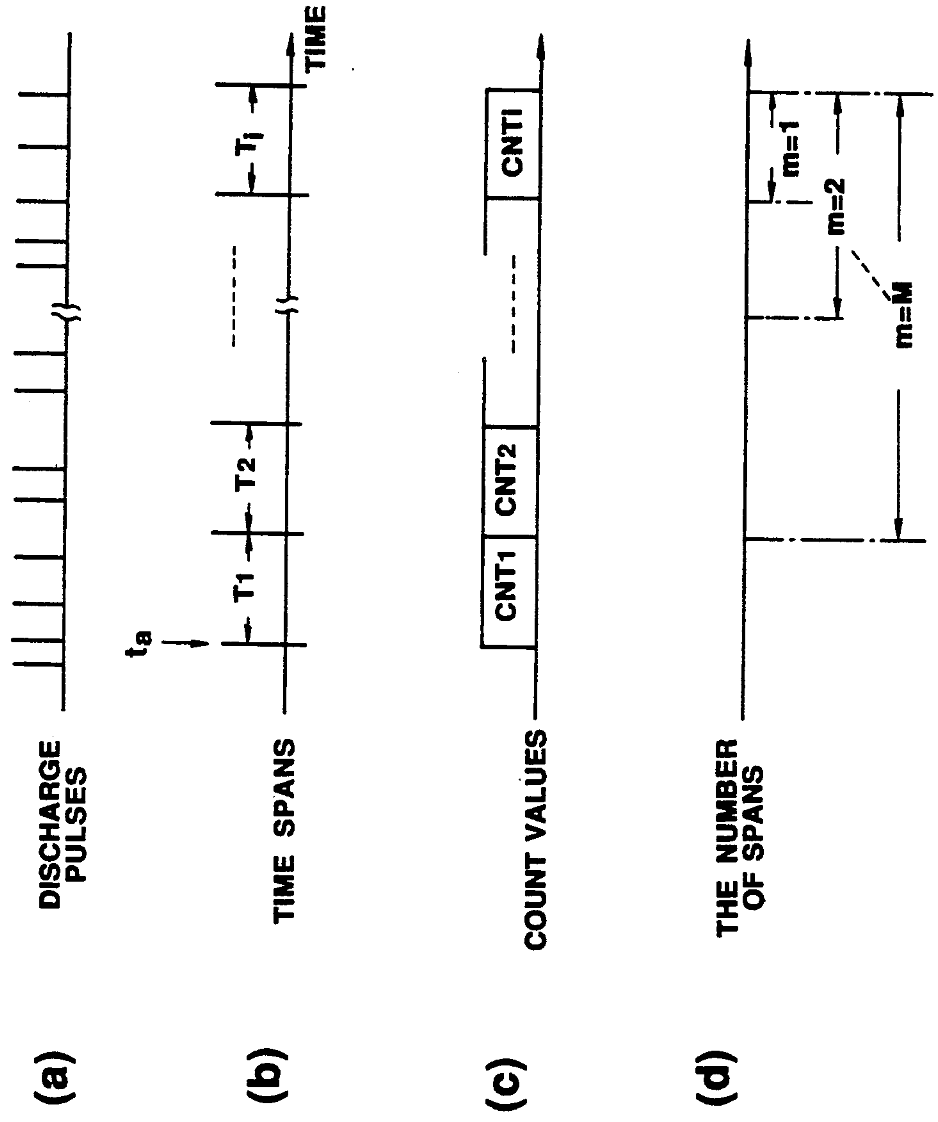
FIG. 3(*a*) to 3(*d*) illustrate an outline of processing of the signal processing unit.
Figure 4:
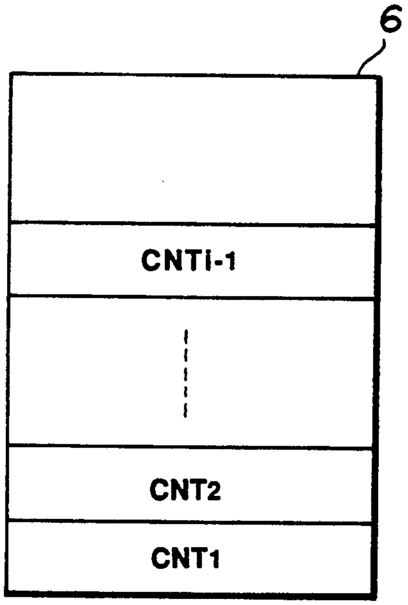
FIG. 4 illustrates an example of the count value storage section.

FIG. 3, (*a*) to (*d*) gives a process summary of the signal processing unit 3 of FIG. 2. The span counting section 5 of the signal processing unit 3 starts the division of spans, for example, at time to a when the number of discharge pulses from the ultraviolet sensor 1 reaches a predetermined level as shown in FIG. 3(*a*), and divides the time base into several time spans, each having a predetermined time interval $T_1$, $T_2$, . . . and $T_i$ as shown in FIG. 3(*b*). The span counting section 5 then counts the number of discharge pulses from the ultraviolet sensor 1 as the count values $CNT_1$, $CNT_2$, . . . and CNT for the spans $T_1$, $T_2$, . . . and $T_i$, respectively, as shown in FIG. 3(*c*). When the count value $CNT_i$ is counted for the latest span $T_i$, the count values CNT1, CNT2, . . . and $CNT_{i-1}$ for the spans $T_1$, $T_2$, . . . and $T_{i-1}$ counted in the past have already been stored in the count value storage section 6 in reverse order starting from the latest span $T_i$, that is to say, in the order of $CNT_{i-1}$, $CNT_{i-2}$, . . . and $C_1$ as shown in FIG. 4.

The calculation section 7 specifies the number of spans from the latest span $T_i$ to the past m-th span $T_{i-m}$ as the number of spans "m" as shown in FIG. 3(*d*) and changes the number of spans "m" to "1", "2", . . . and "M" so that the occurrence of flame is judged for each number of spans. In other words, the occurrence of flame is judged on the basis of only the count value $CNT_i$ for the latest one span $T_i$ (m=1), and then separate from this, the occurrence of flame is judged on the basis of the count values $CNT_i$ and $CNT_{i-1}$ for the two spans $T_i$ and $T_{i-1}$(m=2). In such a fashion, the number of spans "m" is changed up to the maximum number of spans "M", and the occurrence of flame is judged for each number of spans m(m=1,2, . . . , M). If M is the largest span number, the count value storage section 6 can be configured to hold the count values going back from the latest span $T_i$ up to the (M−1)-th span $T_{i-M+1}$. In this case, the count values held in the count value storage section 6 may be erased in order from the oldest.

In judging for the occurence of flame for each number of spans, the calculation section 7 weights the count values depending on the number of spane "m". In order to weight the count values, the signal processing unit 3 has a weight setting section 8.

This weighting may be performed by changing the threshold level for judging flame occurrence for the average count value for the number of spans "m". For example, when the number of spans m is "1" (at the time of judgment of only one span $T_i$), the threshold level is set to the maximum value. And the threshold level is gradually lowered as the number of spans m is increased. Such weighting of the counting values permits the calculation section 7 to detect not only strong flame at an early stage, but also weak flame of long duraction. In more detail, when strong flame occurs, the count value in one span becomes very large and exceeds the maximum threshold level so that the calculation section 7 can detect at an early stage the occurrence of strong flame by judging only span number "1". Contrary to this, when weak flame occurs for a long period of time, the average count value is not so large, however when it continues over multiple spans, the calculation section 7 can detect the occurrence of weak flame by judging the number of spans "m" more than "1".

The inventor of the present application has performed an experiment in which discharge pulses from the ultraviolet sensor for a predetermined period were sampled for a case in which a liquid fuel (for example, normal heptane) was burnt in a bowl, and for another case in which a low-pressure mercury lamp considered to have stable radiation of ultraviolet rays in comparison to actual flame was lit. The experimental results are illustrated in Tables 1 and 2 for the two cases, respectively. Table 1 shows the count value of the number of discharge pulses output from the ultraviolet sensor per elapsed time after burning the liquid fuel (normal heptane) in the bowl, and Table 2 shows the count value of the number of discharge pulses output from the ultraviolet sensor per elapsed time after lighting the low pressure mercury lamp and when the rays from the lamp are incident on the ultraviolet sensor.

one is that the apparatus has to detect flame within a predetermined period (for example, 15 seconds) when it is located at a test distance apart from the position where flame occurs, and the other is that the apparatus should not detect flame until, for example, at least 30 seconds elapses after ignition when it is located at a distance twice the standard distance apart from the position where flame occurs by burning the liquid fuel in the bowl.

In consideration of the experimental results and the standard requirements as described above, the inventor of the present application has contrived a flame detection judgment protocol. This protocol is designed, 1) to provide a flame judgment mode in which the flame occurrence judgment starts at the point in time when the count value reaches a certain level, 2) to provide a judgment span at every predetermined time interval after the flame judgment mode starts, and 3) to assign a time interval which is less than 15 seconds to one time span, and to continue to operate the apparatus in the flame judgment mode while the count value continues to be more than the specified threshold level.

It is preferable that the flame judgment mode is composed of 3 time spans, each having a time interval of approximately 4 seconds, and the count value used for the flame occurrence judgment is weighted for each number of spans.

For example, when the count value weighted based on the experimental results shown in Table 1, the first (TABLE 1)

| | | | | | | | | | | | | | | | |
|---|---|---|---|---|---|---|---|---|---|---|---|---|---|---|---|
| elapsed time (sec) | 4 | 8 | 12 | 16 | 20 | 24 | 28 | 32 | 36 | 40 | 44 | 48 | 52 | 56 | 60 |
| count value | 13 | 7 | 3 | 10 | 11 | 13 | 14 | 18 | 20 | 13 | 17 | 17 | 23 | 19 | 16 |
| elapsed time (sec) | 64 | 68 | 72 | 76 | 80 | 84 | 88 | 92 | 96 | 100 | 104 | 108 | 112 | 116 | 120 |
| count value | 30 | 15 | 20 | 24 | 23 | 23 | 22 | 31 | 26 | 24 | 29 | 31 | 26 | 19 | 25 |
| elapsed time (sec) | 124 | 128 | 132 | 136 | 140 | 144 | 148 | 152 | 156 | 160 | 164 | 168 | 172 | 176 | 180 |
| count value | 22 | 24 | 17 | 23 | 18 | 23 | 17 | 20 | 18 | 20 | 26 | 24 | 28 | 14 | 21 |

average count value (60 to 180 seconds) 22.1 counts/4 sec
standard deviation (60 to 180 seconds) 4.5 counts/4 sec (TABLE 2)

| | | | | | | | | | | | | | | | |
|---|---|---|---|---|---|---|---|---|---|---|---|---|---|---|---|
| elapsed time (sec) | 4 | 8 | 12 | 16 | 20 | 24 | 28 | 32 | 36 | 40 | 44 | 48 | 52 | 56 | 60 |
| count value | 21 | 18 | 20 | 17 | 15 | 20 | 19 | 16 | 11 | 16 | 16 | 13 | 8 | 15 | 17 |
| elapsed time (sec) | 64 | 68 | 72 | 76 | 80 | 84 | 88 | 92 | 96 | 100 | 104 | 108 | 112 | 116 | 120 |
| count value | 13 | 12 | 12 | 8 | 7 | 12 | 11 | 8 | 12 | 8 | 13 | 10 | 12 | 10 | 13 |

average count value (0 to 120 seconds) 13.5 counts/4 sec
standard deviation (0 to 120 seconds) 3.9 counts/4 sec As can be seen from Table 1, when the liquid fuel (normal heptane) is burnt in the bowl, the time average of the count values of the number of discharge pulses becomes stable when approximately 1 minute (60 seconds) elapses after ignition. However, the count value has considerable dispersion around this time average of the count values. The statistical processing for the count values between 1 minute (60 seconds) and 2 minutes (120 seconds) after ignition gives "22.1" for the average count value per 4 seconds, and "4.5" for the standard deviation $\sigma$.

Also, as can be seen from Table 2, for the low-pressure mercury lamp which is considered to radiate stable rays, the dispersion of the count values of the number of pulses does not differ from that of the count values obtained when the liquid fuel was burnt. From this result, it is understood that the dispersion of the count values of the number of pulses is principally inherent in the ultraviolet sensor, and at the present time, this dispersion cannot be decreased.

There are 2 main standards to be met in order to actually commercialize the flame detecting apparatus;

flame judgment is performed by setting the threshold level $MAX_1$ to 36 counts {(average count value (22.1)$+3\times\sigma(3\times4.5)$}, and then determining whether or not the count value accumulated for the latest 1 span is more than the threshold level $MAX_1$.

The second flame judgment is performed by setting the threshold level $MAX_2$ to 54 counts {(average count value (22.1)$+\sigma(4.5))\times2$}, and then determining whether or not the count value accumulated for two successive spans (the latest 1 span and the preceding 1 span) is more than the threshold level $MAX_2$.

The third flame judgment is performed by setting the threshold level $MAX_3$ to 66 counts {(average count value (22.2) $\times3$)}, and then determining whether or not the count value accumulated for 3 successive spans (the latest 1 span and the preceding 2 spans) is more than the threshold level $MAX_3$.

The flame judgment mode ends when the count value in the latest span is less than the threshold level MIN (for example, (average count value-$2\times\sigma$)), and at this time the count value is cleared.

The flame judgment mode as described above is realized by the flame detecting apparatus of FIG. 1 in such a way that the respective threshold levels $MAX_1$, $MAX_2$, $MAX_3$ and MIN are set in advance as the weights in the weight setting section 8 of the signal processing unit 3, with the maximum number of spans M being defined as "3",and the calculation process is performed in the calculation section 7.

Figure 5:
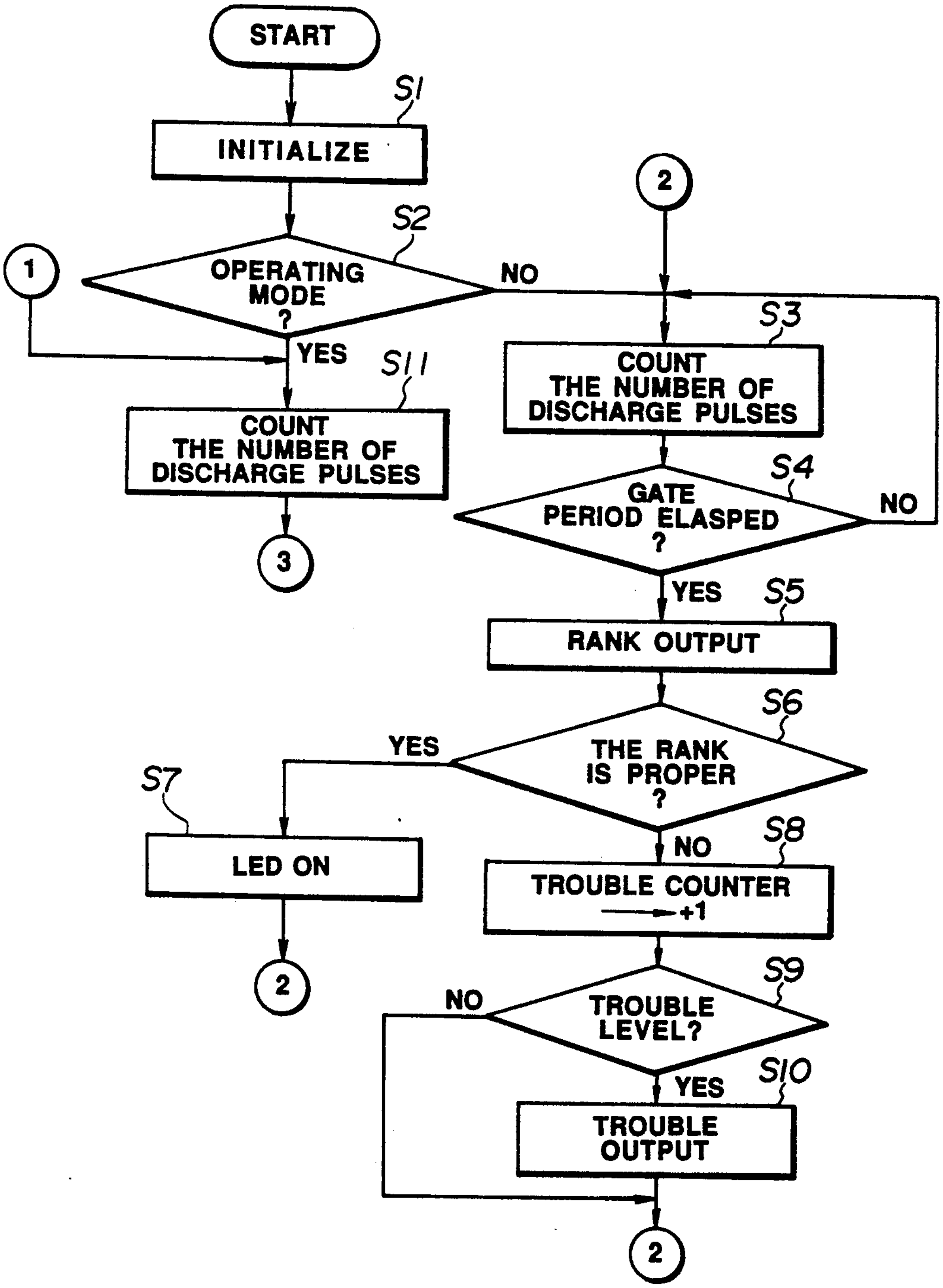
FIG. 5 is a flowchart explaining the operation of the flame detecting apparatus shown in FIG. 1.

The operation of the flame detecting apparatus of FIG. 1 will be explained below employing the flowcharge of FIG. 5 and FIG. 6. Hereinafter, it is assumed that 1) the processing unit 3 is configured to perform the flame judgment mode as described above, 2) $MAX_1$, $MAX_2$, $MAX_3$ and MIN are set in advance as the weights in the weight setting section 8, and 3) the maximum number of spans M is defined as "3" in the calculation section 7. Moreover, it is assumed that the signal processing unit 3 has a confirmation mode for confirming whether or not the apparatus is in trouble, in addition to the above flame judgment mode.

Prior to the actual operation, the sensitivity of the ultraviolet sensor 1 is adjusted by the operator so that a predetermined number of discharge pulses is output from the sensor 1 when a predetermined quantity of ultraviolet rays are incident on the sensor 1. This adjustment can be made by regulating the applied voltage to the ultraviolet sensor 1. After the sensor 1 has been adjusted, the signal processing unit 3 is initialized in order to start the actual flame detecting operation (step S1). for example, a specified counter (not shown) for counting the count value and the count value storage section 6 are cleared, and the number i for identifying the span, is initialized to "1 ".

Thereafter, it is determined whether or not the operation mode is the confirmation mode (step S2). If it is the confirmation mode, the number of discharge pulses from the ultraviolet sensor 1 is counted for the specified period (steps S3 and S4), and the rank corresponding to the count value is output (step S5). The time interval of each span used in the flame judgment mode can be used as the above specified period in the confirmation mode above.

Following step S5, it is determined whether or not the above rank is proper (step S6). If it is proper, it is sent to the output unit 4, which, for example, turns the LEDs which represent that the condition of the apparatus is normal (step S7) and it returns to step S3 again. If, the step S6, the rank is not proper and the count value is, for example "0", a trouble counter is advanced by only "1" (step S8), and then it is determined whether or not the count value of the trouble counter reaches the specified level (trouble level) (step S9). If the count value of the trouble counter reaches the trouble level, the output unit 4 is notified that the apparatus has a trouble, this turns on the LEDs which indicate that the condition of the apparatus is abnormal (step S10).

Figure 6:
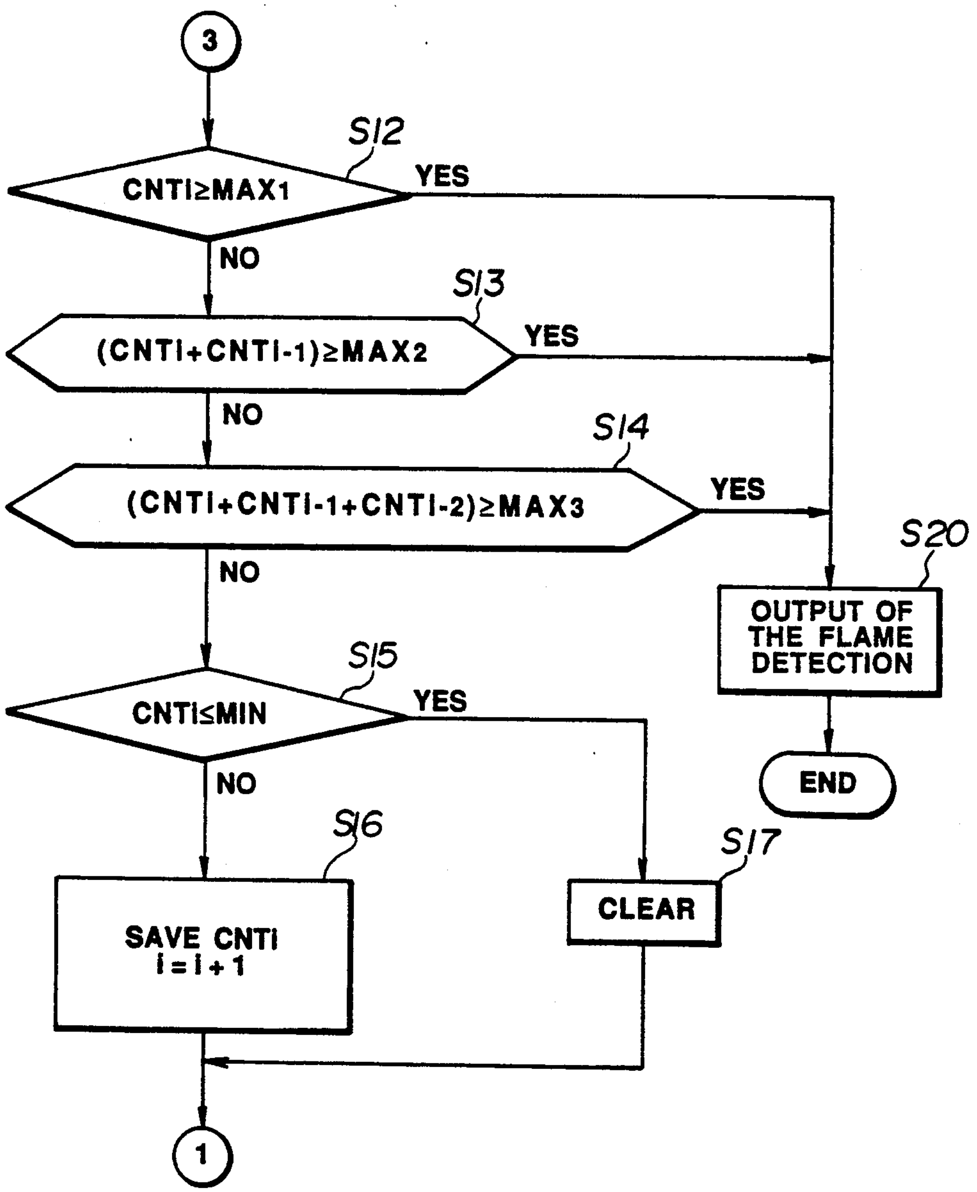
FIG. 6 is a flowchart explaining the operation of the flame detecting apparatus shown in FIG. 1.

On the one had, in the step S2, if the operation mode is not the confirmation mode but the flame judgment mode, the number of discharge pulses from the ultraviolet sensor 1 is counted for a span $T_i$ (step S11), and the flame judgment process of FIG. 6 is carried out.

In other words, now, when the number of discharge pulses in a span Ti is obtained as the count value $CNT_i$, it is determined whether or not the count value $CNT_i$ of the present span $T_i$ is equal to or larger than the threshold level $MAX_1$, (step S12). If it is equal to or larger than the $MAX_1$, the flame occurrence detection is output (step 20).

In step S12, if the count value $CNT_i$ of the present span $T_i$ is smaller than the threshold level $MAX_1$, not only the count value $CNT_i$ but also the count value $CNT_{i-1}$ which has been counted in the preceding span $T_{i-1}$ are both taken into account for the flame occurrence judgment. In other words, it is determined whether the total count value $(CNT_i+CNT_{i-1})$ is equal to or larger than the threshold level $MAX_2$ (step S13). If it is equal to or larger than the threshold level $MAX_2$, the flame occurrence detection is output (step S20).

In step S13, if the total count value $(CNT_i+CNT_{i-1})$ is smaller than the threshold level $MAX_2$, not only the count values $CNT_i$ and $CNT_{i-1}$ but also the count value $CNT_{i-2}$ which has already been counted and held in the count value storage section 6 are all taken into account for the flame judgment. That is to say, it is determined whether or not the total count value $(CNT_i+CNT_{i-1}+CNT_{i-2})$ is equal to or larger than the threshold level $MAX_3$ (step 14). If it is equal to or larger than the threshold level $MAX_3$, the flame occurrence detection is output.

If, in any of the steps S12, S13 and S14, the count values $CNT_i$, $(CNT_i+CNT_{i-1})$ and $(CNT_i+CNT_{i-1}+CNT_{i-2})$ are smaller than the threshold levels $MAX_1$, $MAX_2$ and $MAX_3$, respectively, the flame is not detected, and it advances to step S15. In step S15, it is determined whether or not the count value $CNT_i$ for the present span $T_i$ is smaller than the threshold level MIN. If the count value $CNT_i$ is not smaller than the threshold level MIN. in order to continue the flame judgment mode, the present count value $CNT_i$ is stored in the count value storage section 6, and the number i is advanced by "1", it then returns again to step S11, and the process is performed in a similar manner for the next span $T_{i+1}$.

In step S15, if the count value $CNT_i$ for span $T_i$ is smaller than the threshold level MIN, it is judged that no flame occurs, and the counter and count value storage section 6 are cleared and it returns to the normal mode.

Figure 7:
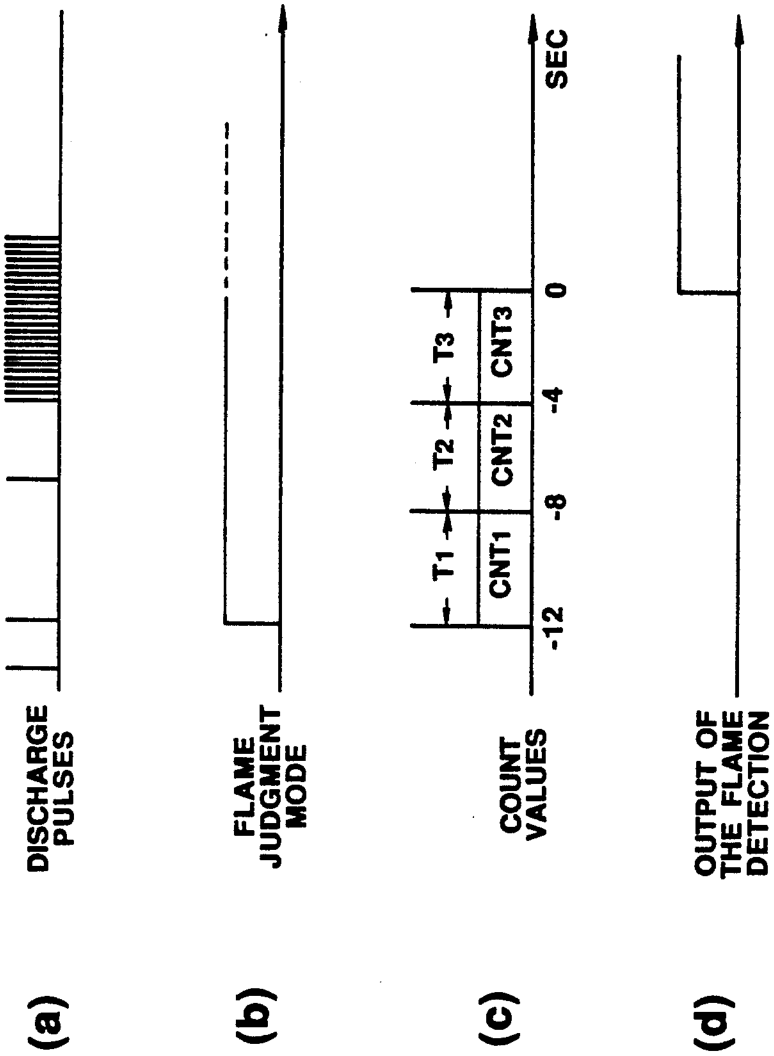
FIG. 7(*a*) to 7(*d*) illustrate the processing example in case strong flame of short duration occurs.
Figure 8:
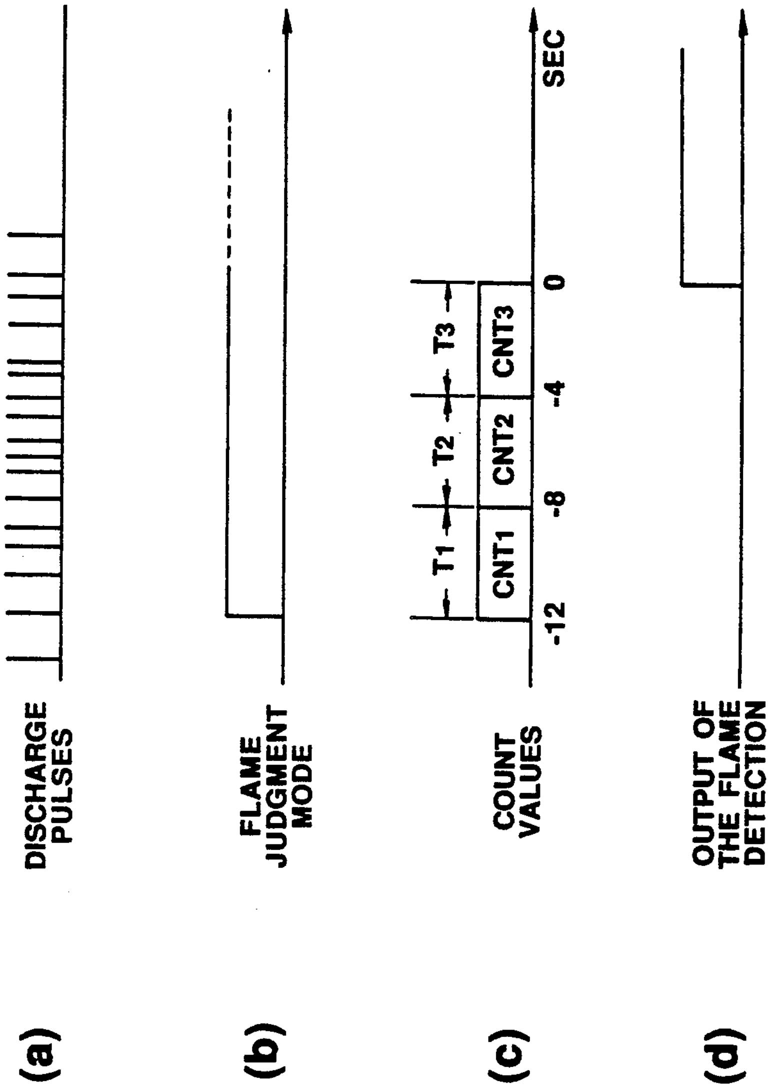
FIG. 8 (*a*) to 8(*d*) illustrate the processing example in case weak flame of long duration occurs.

FIG. 7, (*a*) to (*d*) and FIG. 8, (*a*) to (*d*) illustrate examples of the flame judgment process. FIG. 7, (*a*) to (*d*) shows an example of when strong flame occurs for a short time. When discharge pulses are output from the ultraviolet sensor 1 as shown in FIG. 7 (*a*), the flame judgment mode is started as shown in FIG. 7 (*b*), and the spans $T_1$, $T_2$ and $T_3$ are set, respectively, each at intervals of 4 seconds starting from the start of the flame judgment mode as shown in FIG. 7 (*c*). In this example, because discharge pulses are mainly output from the ultraviolet sensor 1 in the latest span $T_3$, and because there are plenty of discharge pulses per a predetermined period, the count value $CNT_3$ in spane $T_3$ exceeds the threshold level $MAX_1$. Therefore, strong flame can be detected as shown in FIG. 7(*d*).

FIG. 8, (*a*) to (*d*) shows an example of when weak flame occurs for a long time. In this case, the number of discharge pulses from the ultraviolet sensor 1 is small in quantity per a predetermined period. However, since discharge pulses are output extending over the spans $T_3$, $T_2$ and $T_1$, the total count value $(CNT_3+CNT_2+CNT_1)$ exceeds the threshold level $MAX_3$ as shown in FIG. 8(*d*). Therefore, weak flame of short duration can also be detected.

As shown in the example above, in any case when the count value $CNT_3$ for the latest span $T_3$ exceeds the threshold level $MAX_1$, or when the count value $(CNT_3+CNT_2)$ for the two successive spans $T_3$ and $T_2$ exceeds the threshold level $MAX_2$, or when the count value ($CNT_3+CNT_2+CNT_1$) for the three successive spans $T_3$, $T_2$ and $T_1$ exceeds the threshold level $MAX_3$, the apparatus of the present invention allows the occurrence of flame to be detected. As a result, it is possible to detect strong flame of short duration at an early stage, as shown in FIG. 7 (*d*). Also, even when it is ambiguous as to whether or not flame occurs on the basis of the count value per a predetermined period, the occurrence of such a flame can be judged with good reliability and certainty, by taking into account the count value for the preceding spans, in addition to the count value for the latest span. Therefore, it is also possible to detect weak flame of long duration with certainty, as shown in FIG. 8 (*d*). Thus, even if the condition of flame changes due to the combustion conditions, environmental influences, etc. during fire and the like, flames can be detected accurately in the early stages.

In the example described above, the count values $CNT_2$ and $CNT_1$ of the preceding spans $T_2$ and $T_1$ and the count value $CNT_3$ for the latest span $T_3$ are added for the judgment. However, in place of the using of the simple sum, it is also possible to judge the occurrence of flame by checking the relationship or trend between the count value $CNT_3$ for the latest span $T_3$ and the count values $CNT_2$ and $CNT_1$ for the preceding spans $T_2$ and $T_1$.

Also, in the above example, accurate flame judgment can be performed probablisticly, even if the discharge pulses have considerable dispersion, by changing the threshold levels $MAX_1$, $MAX_2$, and $MAX_3$, respectively, and by weighting the count values, depending on the number of spans, so that the threshold level is higher for a lower number of spans.

The above example is configured to start the flame judgment mode when the count value reaches a certain level. However, the flame judgment mode may be started when a discharge pulse is output.

Furthermore, the threshold levels $MAX_3$, $MAX_2$ and $MAX_1$ are set to specified values, respectively, by using the average and standard deviation $\sigma$ derived from the experimental results shown in Table 1. However, it is also possible to set these threshold levels to arbitrary desired values. Also, the second flame judgment is performed by determining whether or not the count value accumulated for 2 successive spans is more than the $MAX_2$, but this judgment may be performed by checking whether any one of the count values for 2 successive spans is more than the $MAX_2/2$. Similarly, the third flame judgment may be performed by determining whether or not any one of the count values for 3 successive spans is more than the $MAX_3/3$.

Furthermore, in the above example, it is possible to assign the maximum number of spans M to be "2", or even more than "3", though the above example assigns it to "3". Also, each span has the same time interval in the above example, but instead of this, the spans can be divided so that they each have different time intervals. For example, each span may be divided to have a different alternative time interval.

Figure 9:
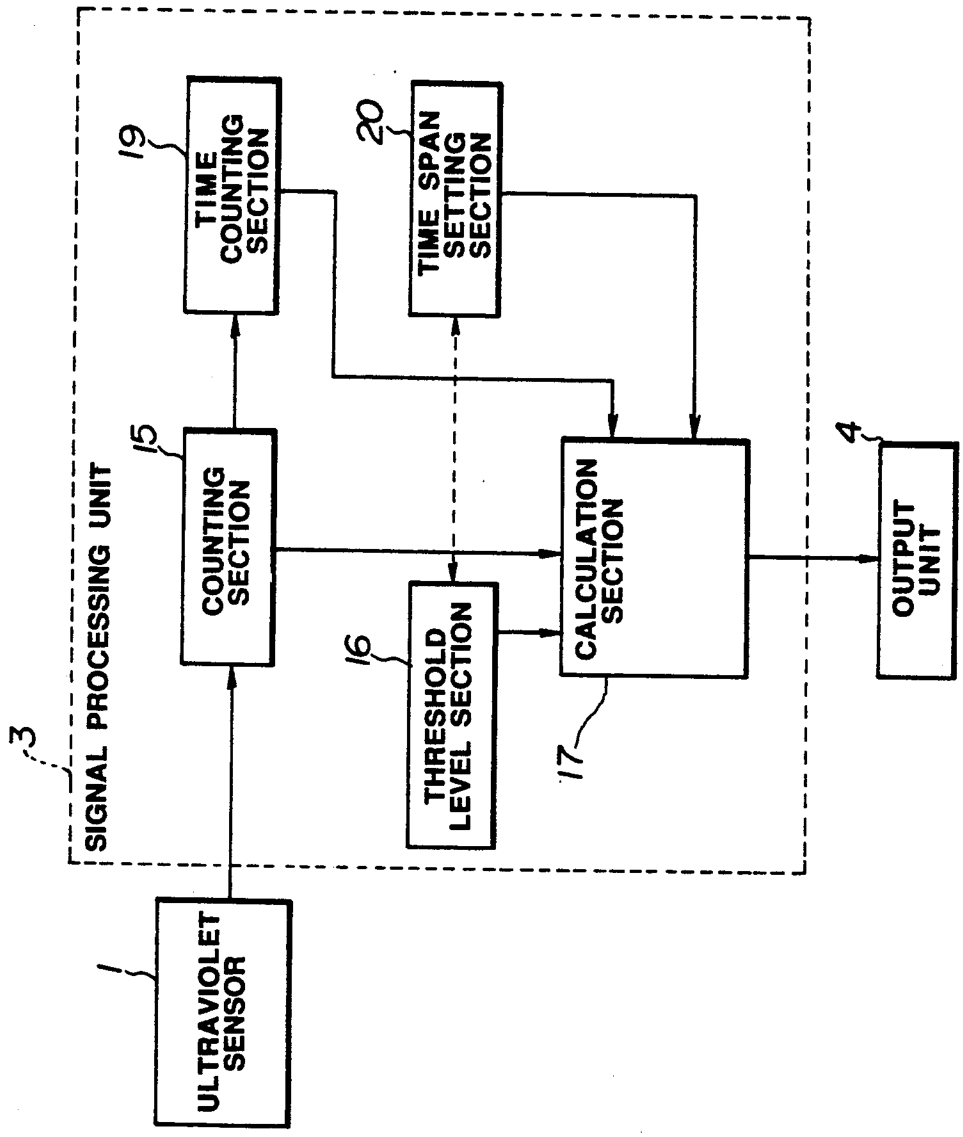
FIG. 9 illustrates a second example of the signal processing unit.

FIG. 9 is a block diagram showing a second example of the signal processing unit 3. The signal processing unit 3 of FIG. 9 includes a counting section 15 for counting the number of discharge pulses from the ultraviolet sensor 1 as a count value, a threshold level section 16 for setting predetermined threshold levels for the count value, a time counting section 19 for counting the time length after the counting section 15 has started counting the count value, a time span setting section 20 in which a time span corresponding to each of the threshold levels is set, and a calculation section 17 which compares the time length counted by the time counting section 19 until the count value reaches any one of the threshold levels with the time span which is set in advance in the time span setting section 20 in correspondence with this threshold level, and which performs the flame occurrence judgment based on the comparison results.

Figure 10:
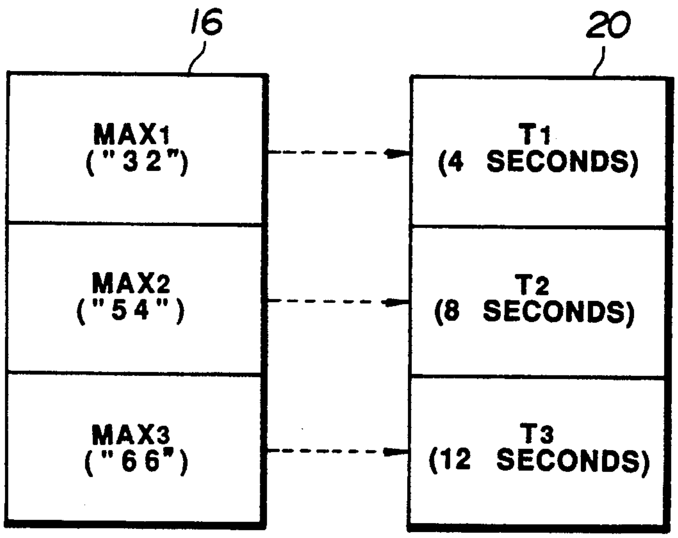
FIG. 10 illustrates an example of the threshold level section and time span setting section.

The operation of the apparatus in which the signal processing section 3 is configured as shown in FIG. 9 will be explained. It is assumed that 3 threshold levels $MAX_1$ (count value "32"), $MAX_3$ (count value "54") and $MAX_3$ (count value "66") are set in advance in the threshold level section 16, and the time spans $T_1$ (4 seconds), $T_2$ (8 seconds) and $T_3$ (12 seconds) are set in advance in the time span setting section 20 corresponding to the threshold levels $MAX_1$, $MAX_2$ and $MAX_3$, as shown in FIG. 10.

The counting section 15 starts counting the count value CNT, for example, when the number of discharge pulses per predetermined period from the ultraviolet sensor 1 is more than the specified value. At the same time counting of the count value starts, counting of the time length t in the time counting section 19 starts.

When the count value CNT reaches the threshold level MAX ("32"), as the first stage, the time counting section 19 sends the time length t counted up until then to the calculation unit 17, which compares the counted time length t and the time span $T_1$ (4 seconds) which corresponds to the threshold level $MAX_1$ ("32"). If the time length t is shorter than the time span $T_1$ (4 seconds), it is judged that a predetermined number of discharge pulses are output from the ultraviolet sensor 1 within a short period (within 4 seconds in this example) due to the occurrence of flame, and then the alarm or the like is output.

If the time length t is not shorter than the time span $T_1$ (4 seconds), flame occurrence is not judged at this stage, and the count value CNT and the time length t continue to be counted. As the second stage, when the count value CNT reaches the next threshold level $MAX_2$ ("54"), the calculation section 17 compares the counted time length t and the time span $T_2$ (8 seconds) which length t is shorter than the time span $T_2$ (8 seconds), it is judged that flame occurs, and the alarm or the like is output.

When, the time t is not shorter than the time span $T_2$ (8 seconds), flame occurrence is not judged at this second stage, and the count value CNT and the time length t continue to be counted. As the third stage, when the count value CNT reaches the next threshold level $MAX_3$ ("66"), the calculation section 17 compares the counted time length t and the time span $T_3$ (12 seconds) which corresponds to the threshold value level $MAX_3$ ("66"). If the time length t is shorter than the time span $T_3$ (12 seconds), it is judged that a predetermined number of discharge pulses were output continuously from the ultraviolet sensor 1 for a certain period due to the occurrence of flame, and the alarm or the like is output.

If, the time length t is not shorter than the time span $T_3$ (12 seconds), it is judged that flame does not occur, and processing ends without outputting the alarm or the like.

In this way, the apparatus, in which signal processing is configured as shown in FIG. 9, can also detect flame which varies due to the combustion conditions, environmental influences, etc., accurately and in the early stages. Therefore, strong flame of short duration can be detected accurately at an early stage (i. e., at the first stage), and weak flame of long duration can be detected accurately at the second or third stage.

As can be seen from the above explanation, in the signal processing unit of FIG. 9, the count value is divided into threshold levels, and flame judgment is performed depending on whether or not the time length until the count value reaches the threshold level is shorter than the time span corresponding to the threshold level, while, in the signal processing unit of FIG. 2, the time base is divided into spans, and the flame judgment is performed depending on whether or not the count value within the span is more than a predetermined threshold level.

Thus the signal processing unit of FIG. 9 can detect the flame occurrence at an earlier stage, compared to the signal processing unit of FIG. 2. In other words, the signal processing unit of FIG. 2 cannot detect the flame occurrence without waiting the predetermined time span (ex. 4 seconds), for example, even when strong flame of short duration occurs. However, the signal processing unit of FIG. 9 can detect the flame occurrence at the point of time that the count value reaches the specified threshold level within the above time span without waiting for the predetermined time span to elapse (ex. 4 seconds).

Figure 11:
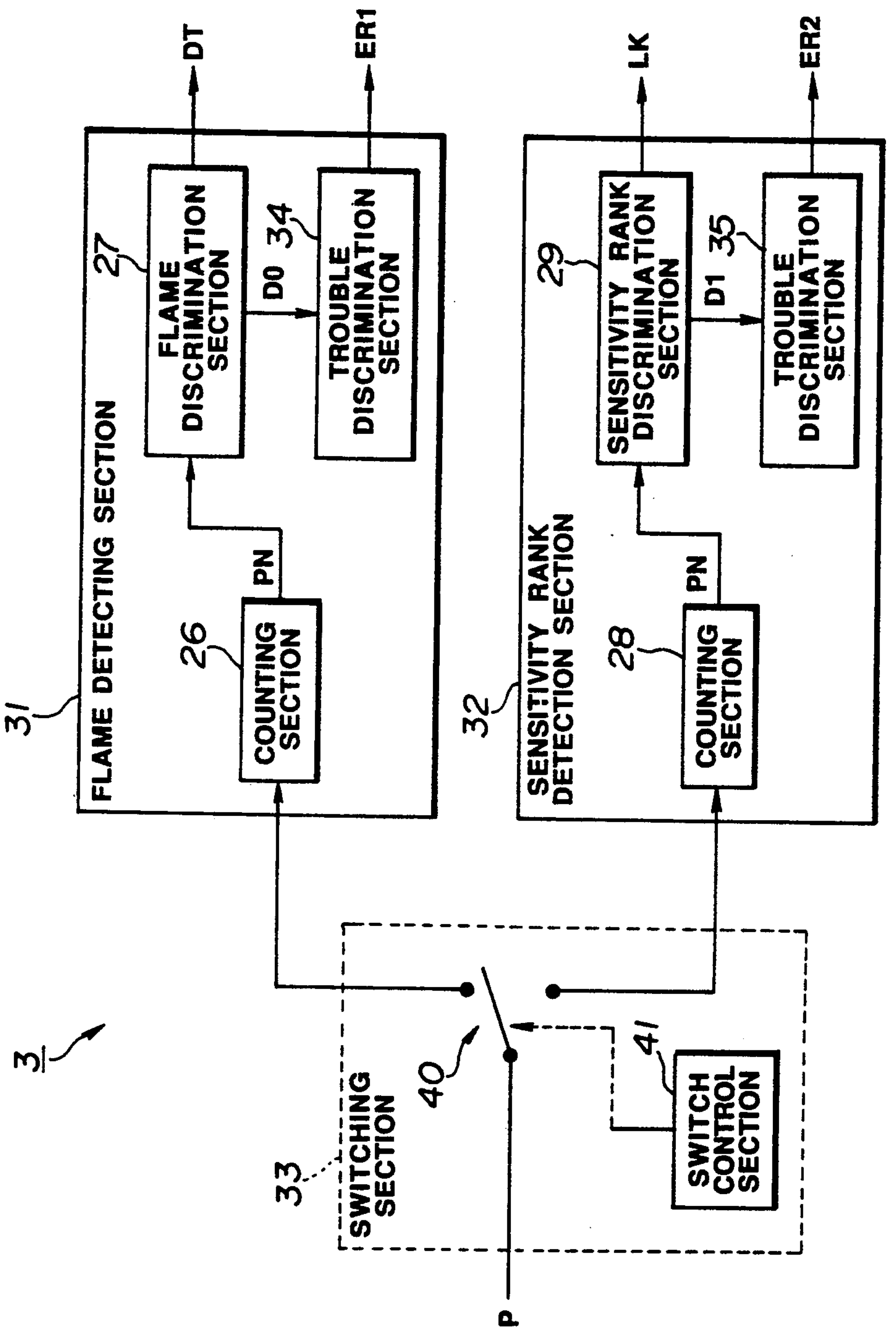
FIG. 11 shows a third example of the signal processing unit.

FIG. 11 illustrates a third example of the signal processing unit 3. The signal processing unit 3 of FIG. 1 includes a function for detecting the sensitivity of the ultraviolet sensor 1 as a sensitivity rank in addition to a function for detecting the occurence of flame. That is, the signal processing unit 3 shown in FIG. 9 is provided with a flame detecting section 31 for actually detecting flame, a sensitivity rank detection section 32 for detecting the sensitivity rank of the ultraviolet sensor 1, and a switching section 33 for switching the operating mode so that the flame detecting section 31 is selected and operated when the flame detecting operation is conducted (flame detecting mode) and that the sensitivity rank detection section 32 is selected and operated when a confirmation operation such as inspection, testing and the like is conducted (confirmation mode).

The flame detecting section 31 has a counting section 26 for counting the number of discharge pulses P output from the ultraviolet sensor 1, a flame discrimination section 27 which outputs a flame detection signal (ex. a fire signal) DT when the number of discharge pulses PN per predetermined period counted by the counting section 26 exceeds a specified level (ex. fire level) and outputs a detection signal D0 when the number of discharge pulses PN per predetermined period is less than a specified level (ex. approximately "0"), and a trouble discrimination section 34 for outputting a trouble signal ER1 when the detection signal D0 is continuously output from the flame discrimination section 27, for example, for a day. In this case, it is possible to configure the flame detecting section 31 to further include a function that the signal processing section 3 of FIG. 2 or FIG. 9 has.

Similarly, the sensitivity rank detection section 32, has a counting section 28 for counting the number of discharge pulses P output from the ultraviolet sensor 1, a sensitivity rank discrimination section 29 which outputs, for example, a coded sensitivity rank signal LK which represents the sensitivity rank of the ultraviolet sensor 1 determined on the basis of the number PN of discharge pulses P per predetermined period, and outputs a detection signal D1 when the number PN of discharge pulses P per predetermined period is less than a specified level (which is approximately "0"), and a trouble discrimination section 35 for outputting a trouble signal ER2 that represents that the apparatus is in trouble when the detection signal D1 is continuously output from the sensitivity rank discrimination section 29, for example, for one minute.

In the case where the switching section 33 is a manual switch 40, the flame detection mode is selected when the switch 40 is set to OFF, and the confirmation mode is selected when the switch 40 is set to ON. In the example shown in FIG. 11, the switching section 33 has another switch control section 41 which measures the time from the point when the operator sets the switch 40 to ON until it exceeds a predetermined time (for example, 5 minutes), after which the switch 40 is reset to the OFF state.

Similar to the first or second example as shown in FIG. 2 or FIG. 9, the signal processing unit 3 of this third example may be composed of a one-chip CPU and the like, where the flame detection section 31, sensitivity rank detection section 32 and switch control section 41 can be realized by the software program.

Figure 12:
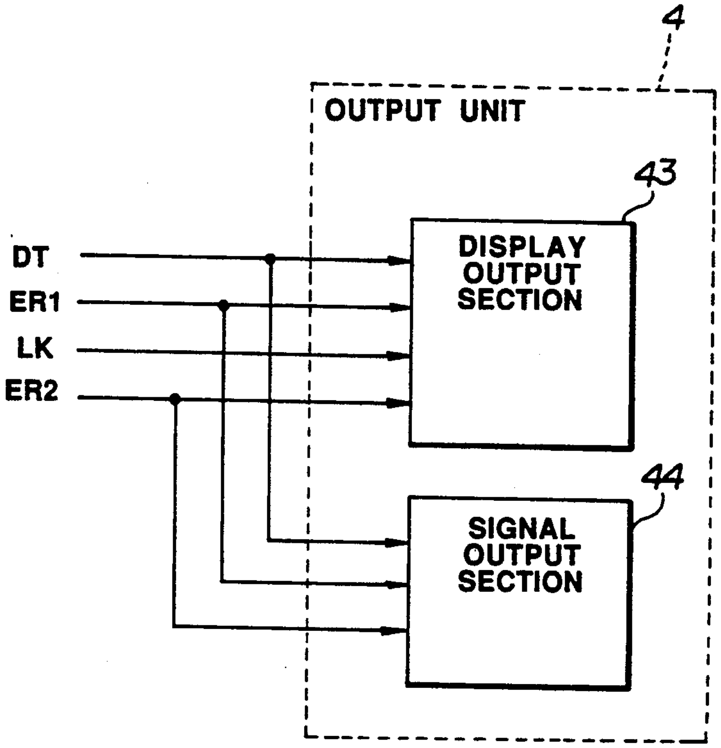
FIG. 12 illustrates an example of the output section.

FIG. 12 illustrates an example of the output unit 4 in the case where the signal processing unit 3 is with a configuration as shown in FIG. 11. The output unit 4 shown in FIG. 12 has a display output section (LED and the like) 43 for displaying the operating condition of the flame detecting apparatus determined by the signal processing unit 3, and a signal output section 44 for outputting the operating condition of the flame detecting apparatus, for example, a fire alarm.

Figure 13:
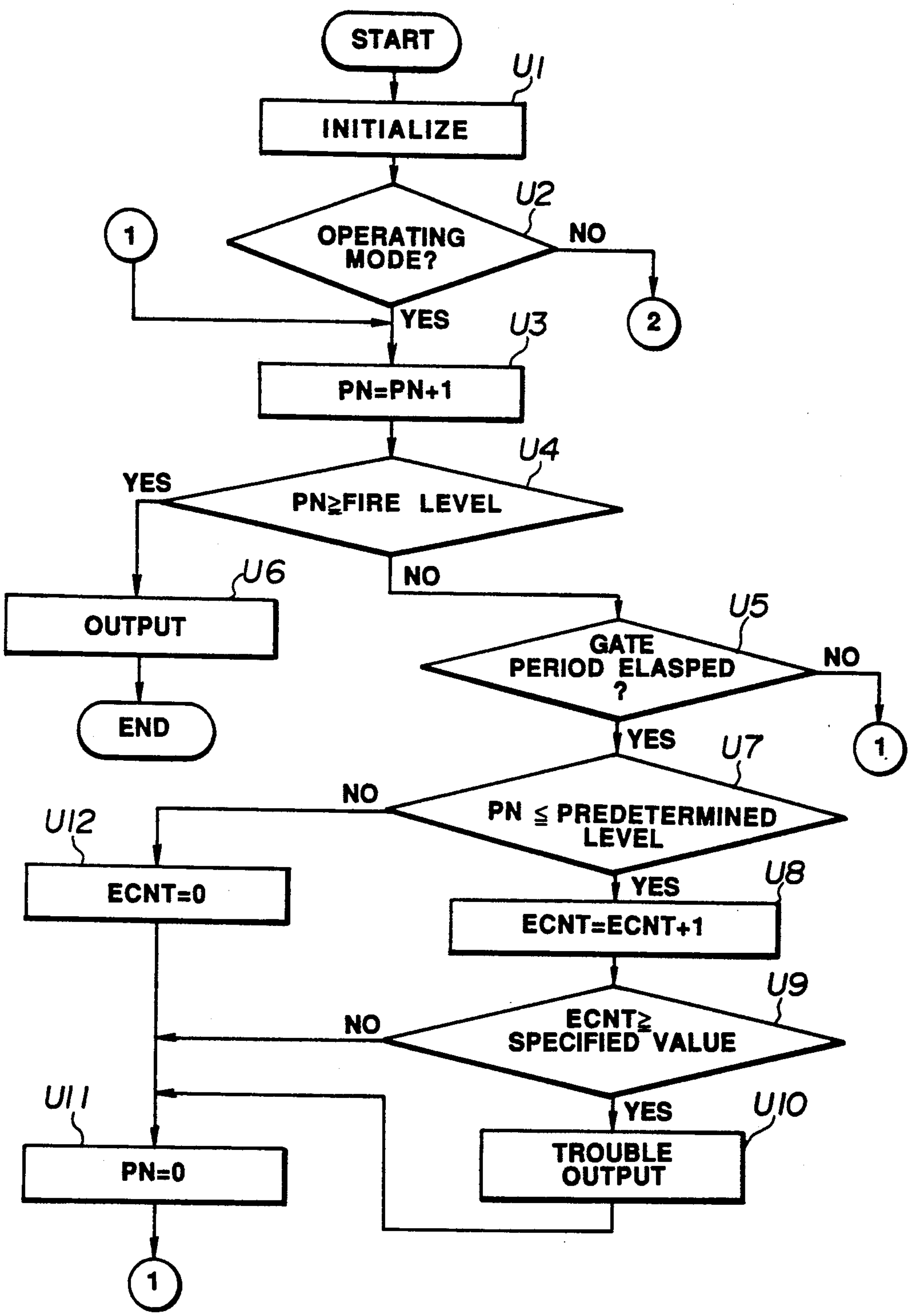
FIG. 13 is a flowchart explaining another operation of the flame detecting apparatus shown in FIG. 1.
Figure 14:
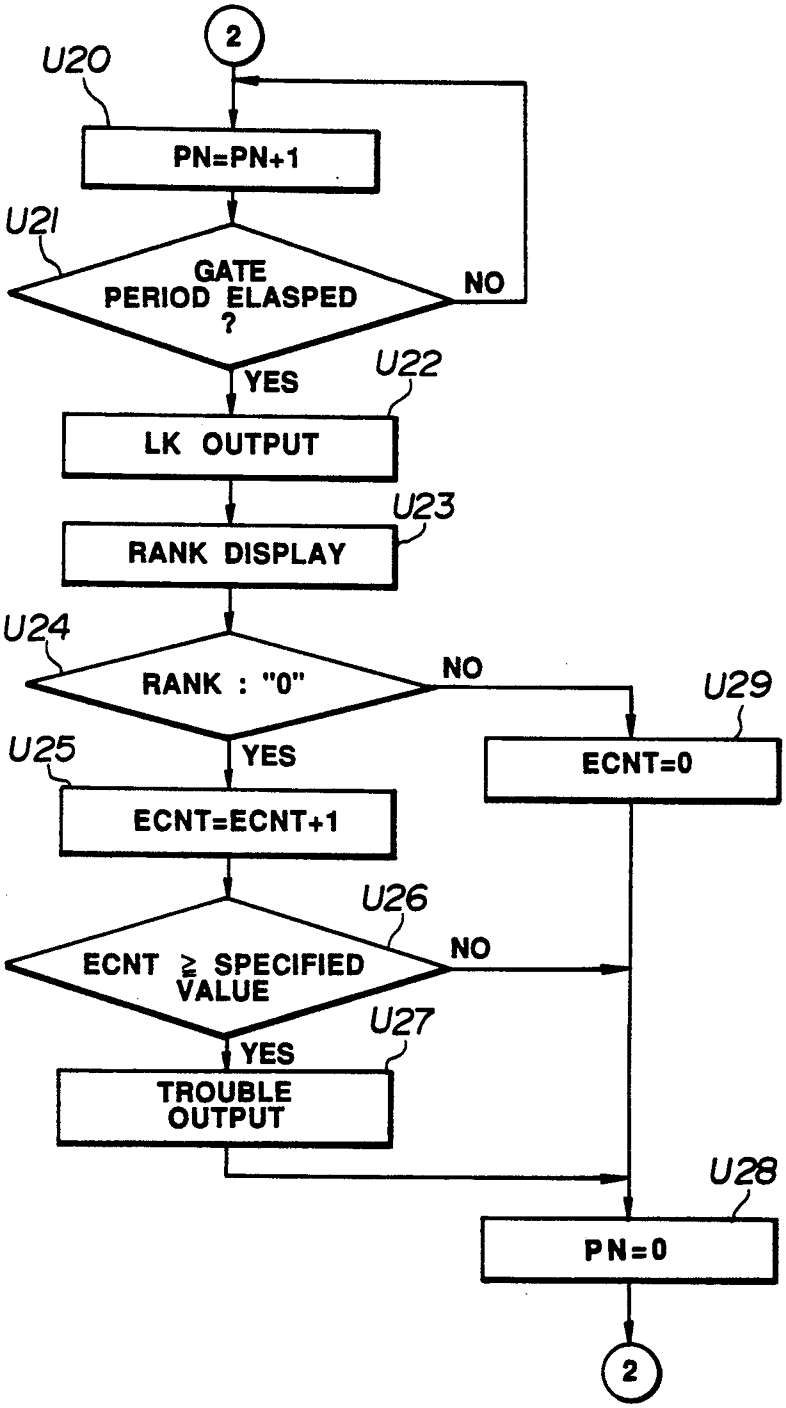
FIG. 14 is a flowchart explaining another operation of the flame detecting apparatus shown in FIG. 1.

The operation of the flame detecting apparatus with a configuration such as this, and particularly the operation of the signal processing unit 3 and output unit 4, will be explained with reference to the flowcharts shown in FIGS. 13 and 14. Hereinafter, it is assumed that a one-chip CPU is employed in the signal processing unit 3, and each function in the signal processing unit 3 is realized by the program. If the power of the flame detecting apparatus is turned ON, an initialization program in the signal processing unit 3 is executed, and the counting sections 26 and 28 and so on are initialized (step U1). Thereafter, the selection of the operating mode is performed in the signal processing unit 3 according to the state of the switch 40 in the switching selection section 33 (step U2). For example, when the switch 40 is set to the OFF state, the flame detecting mode is selected, and the flame detecting process of steps U3 to U12 is executed. On the other hand, when the operator set the switch 40 to the ON state in order to confirm the condition of the flame detecting apparatus at the time of manufacturing or at the time of periodic inspection, the confirmation mode is selected, and the confirmation process of steps U20 to U29 is executed.

In other words, when the switch 40 is set to the OFF state to select the flame detecting mode, discharge pulses P which are output from the ultraviolet sensor 1 are sent to the flame detecting section 31. When this happens, the ultraviolet rays produced in the area where the flame detecting apparatus is installed are incident on the ultraviolet sensor. The pulse counter PN of the counting section 26 is advanced by "1", each time a discharge pulse P is sent from the ultraviolet sensor 1.

Thus, the number PN of discharge pulses P is counted (step U3). At this time, a determination is made in the flame discrimination section 27 as to whether or not the number PN of discharge pulses P exceeds the fire level (step U4). If the fire level has not been exceeded, a determination is further made as to whether a predetermined period (gate period) has elapsed after starting the count of the number of pulses P (step U5). If the period has not elapsed, it returns to step U3 in order to continue counting the number PN of discharge pulses P in the counting section 26. In this case, the fire level can be set to $MAX_1$, $MAX_2$, $MAX_3$, and a determination similar to steps S12 to S14 as shown in FIG. 6 can be made.

When the number PN of discharge pulses P in step U4 reaches the fire level within the gate period, the flame discrimination section 27 determines that flame has occurred, and sends the flame detecting signal DT to the output unit 4. By doing so, the output unit 4 displays that fire has occurred using the display output section 43, and a flame occurrence signal is output from the signal output section 44 (step U6).

On the other hand, if the number PN of discharge pulses P does not reach the fire level within the gate period, the flame discrimination section 27 determines that no fire occurs, and does not send the flame detecting signal to the output section 4. In this case, the fire discrimination section 27 further determines whether or not the number of PN discharge pulses P per gate period is less than the specified level (which is approximately "0") (step U7). If the number of discharge pulses PN per gate period is less than this level, the detection signal D0 is sent to the trouble discrimination section 34, which increments the trouble counter ECNT in the trouble discrimination section 34 by only "1" (step U8). In the trouble discrimination section 34, a determination is made as to whether or not the trouble counter ECNT reaches the specified value (step U9). If the trouble counter ECNT reaches the specified value, that is to say, if the number of discharge pulses PN per gate period continues to be less than the specified level, for example, for a day, the trouble discrimination section 34 determines that the apparatus is in trouble, and outputs a trouble signal ER1 to the output unit 4. In the output unit 4, the display output section 43 displays that the apparatus is in trouble, and the signal output section 44 outputs the trouble signal (step U10). The operator can immediately recognize that the detecting apparatus is in trouble according to the display and signal output.

On the other hand, if the flame discrimination section 27 determines that the number of discharge pulses PN per gate period is neither more than the fire level in step U4, nor less than the level of approximately "0" in step U7, the flame detecting section 31 determines that flame did not occur in the area of installation and the flame detecting apparatus is normal, and at this time, the trouble counter ECNT and the pulse counter PN are initialized to "0", respectively (step U12, U11). Thereafter, it returns again to step U3, and a similar process is repeated for the next gate period. Besides this, the pulse counter PN is also initialized to "0" (step U11), when either the duration of the condition when the number of discharge pulses PN per gate period is at less than the specified level does not yet reach the period (ex. 1 day) judged as the trouble in step U9, or when the trouble signal is output in step U10. In this case also, it returns again to step U3 to count the number of discharge pulses in the next gate period.

While the flame detecting operation is actually being executed at the site of installation in the way described above, if it is desired to inspect or test the flame detecting apparatus, the operator sets the switch 40 to ON so as to allow a predetermined quantity of ultraviolet rays from the standard light source 50 (see FIG. 1) to be incident onto the ultraviolet sensor 1. In this case, when the ultraviolet rays from the standard light source 50 are incident onto the ultraviolet sensor 1, discharge pulses P proportional to the quantity of light from the standard light source 50 are output from the ultraviolet sensor 1 and are sent to the sensitivity rank detection section 32.

Each time a discharge pulse P from the ultraviolet sensor is sent, the pulse counter PN in the counting section 28 of the sensitivity rank detection section 32 is advanced by only "1", and the number of discharge pulses PN are counted (step U20) until the predetermined period (gate period) elapses (step U21). Then, the sensitivity rank of the ultraviolet sensor 1 is determined in the sensitivity rank discrimination section 29 depending on the number of discharge pulses PN in the gate period, and a sensitivity rank signal LK is sent to the output unit 4 (step U22). As a result, the sensitivity ran is displayed in the display output section 43 of the output unit 4 (step U23), which enables the operator to recognize the sensitivity of the ultraviolet sensor 1. If the sensitivity is not the one desired, the voltage V can be changed by operating the adjustment section 10 of the sensitivity adjustment unit 2. Thus, the sensitivity of the ultraviolet sensor 1 can easily be adjusted.

On the other hand, in the sensitivity rank discrimination section 29, if the number of discharge pulses PN during the gate period is less than the specified level (approximately "0"), the sensitivity rank is determined to be "0" (step U24), and the sensitivity rank discrimination section 29 sends the detection signal D1 to the trouble discrimination section 35. In the trouble discrimination section 35, the trouble counter ECNT is increased by only "1" each time the detection signal D1 is sent (step U25), and a determination is made as to whether or not the trouble counter ECNT has reached the specified value (step U26). If the trouble counter ECNT has reached the specified value, that is to say, if the condition of the sensitivity rank being "0" continues for a specified period (for example, for 1 minute), the trouble discrimination section 35 determines that the apparatus is in trouble, and outputs the trouble signal ER2 to the output unit 4. As a result, the trouble is displayed by the display output section 43 of the output unit 4, and the trouble signal is output from the signal output section 44 (step U27). From this display and signal output, the operator can immediately recognize that the flame detecting apparatus is in trouble. When it is determined that the sensitivity rank is not "0" in step U24, the trouble counter ECNT is initialized to "0" (step U29), and then it returns again to step U20. After troubleshooting is performed in step U26, the pulse counter PN is initialized to "0" (step U28), and then it returns again to step U20 in order to continue detecting the sensitivity rank of the next gate period.

In this way, the flame detecting apparatus installed in a specified place can perform, not only actual flame detection, but also sensitivity rank detection and troubleshooting.

Figure 15:
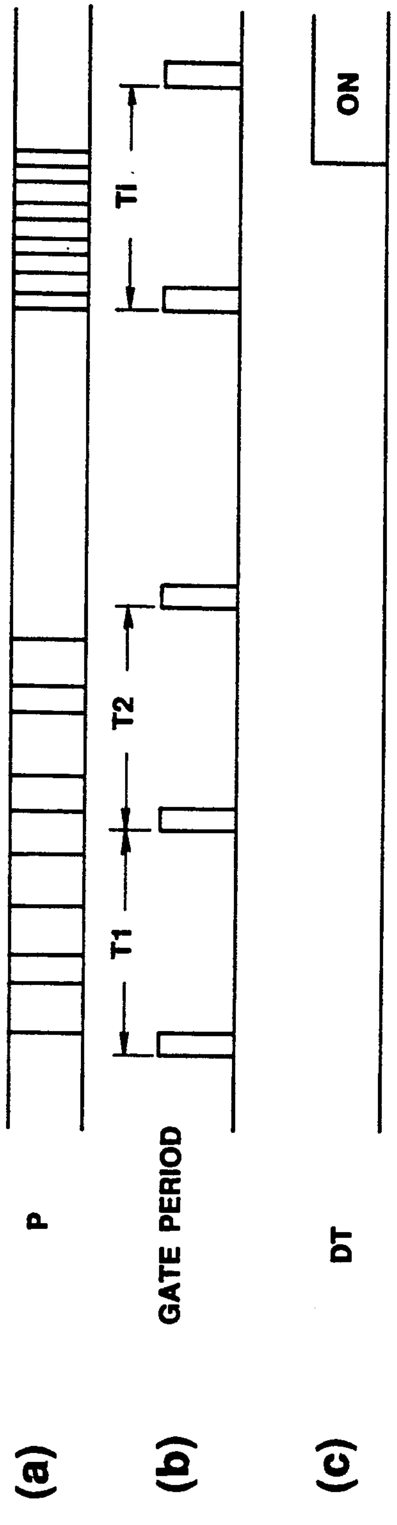
FIG. 15(*a*) to 15(*c*) are time charts explaining an example of detecting the occurrence of flame in the flame detecting mode.
Figure 16:
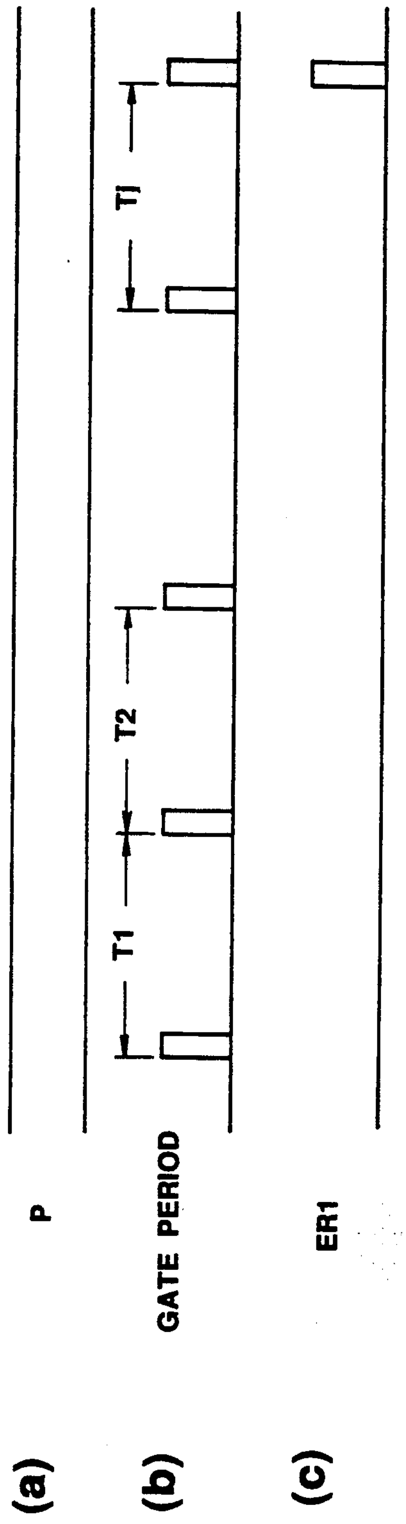
FIG. 16(*a*) to 16(*c*) are time charts explaining an example of detecting a trouble in the flame detecting mode.

FIG. 15, (*a*) to (*c*) are time charts illustrating in detail an example of detecting the occurrence of flame in the flame detecting mode, and FIG. 16, (*a*) to (*c*) are time charts illustrating in detail an example of detecting trouble in the flame detecting mode.

When discharge pulses P are output from the ultraviolet sensor 1 as shown in FIG. 15(*a*), the number PN of discharge pulses P is counted by the counting section 26 of the flame detecting section 31 for each gate period T1, T2, . . . and Tj (for example, approximately every 4 seconds), as shown in FIG. 15(*b*). If the number PN of discharge pulses P in a gate period Ti exceeds the fire level, the flame detection section 27 sends the fire signal DT to the output unit 4 at the point of time as shown in FIG. 15(*c*). In so doing, the display and signal output of the flame occurence are performed by the output unit 4.

On the other hand, as shown in FIG. 16(*a*), when no discharge pulse is output from the ultraviolet sensor 1, and the number PN of discharge pulses P is counted as less than a certain value (ex. "0") for each gate period T1, T2, . . . and Tj (which is set to, for example, approximately 4 seconds) as shown in FIG. 16(*b*), the fire discrimination section 27 sends the detection signal D0 for each gate period to the trouble discrimination section 34. When this detection signal D0 occurs a specified number of times (for example, j times), the trouble discrimination section 34 outputs the trouble signal ER1 to the output unit 4, as shown in FIG. 16(*c*). In so doing, the display and the signal output of the trouble are performed by the output unit 4. When this condition continues further, the trouble signal ER1 is repetitively output.

Figure 17:
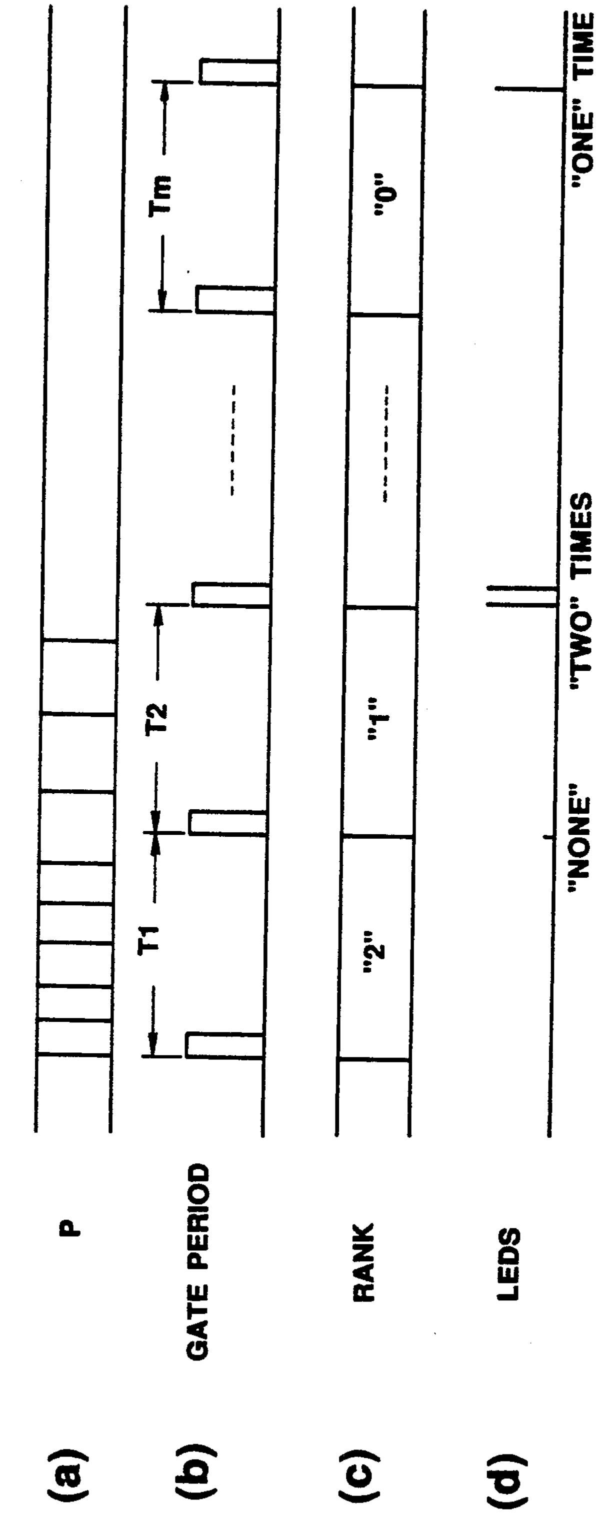
FIG. 17(*a*) to 17(*d*) are time charts explaining an example of detecting the sensitivity rank in the confirmation mode.
Figure 18:
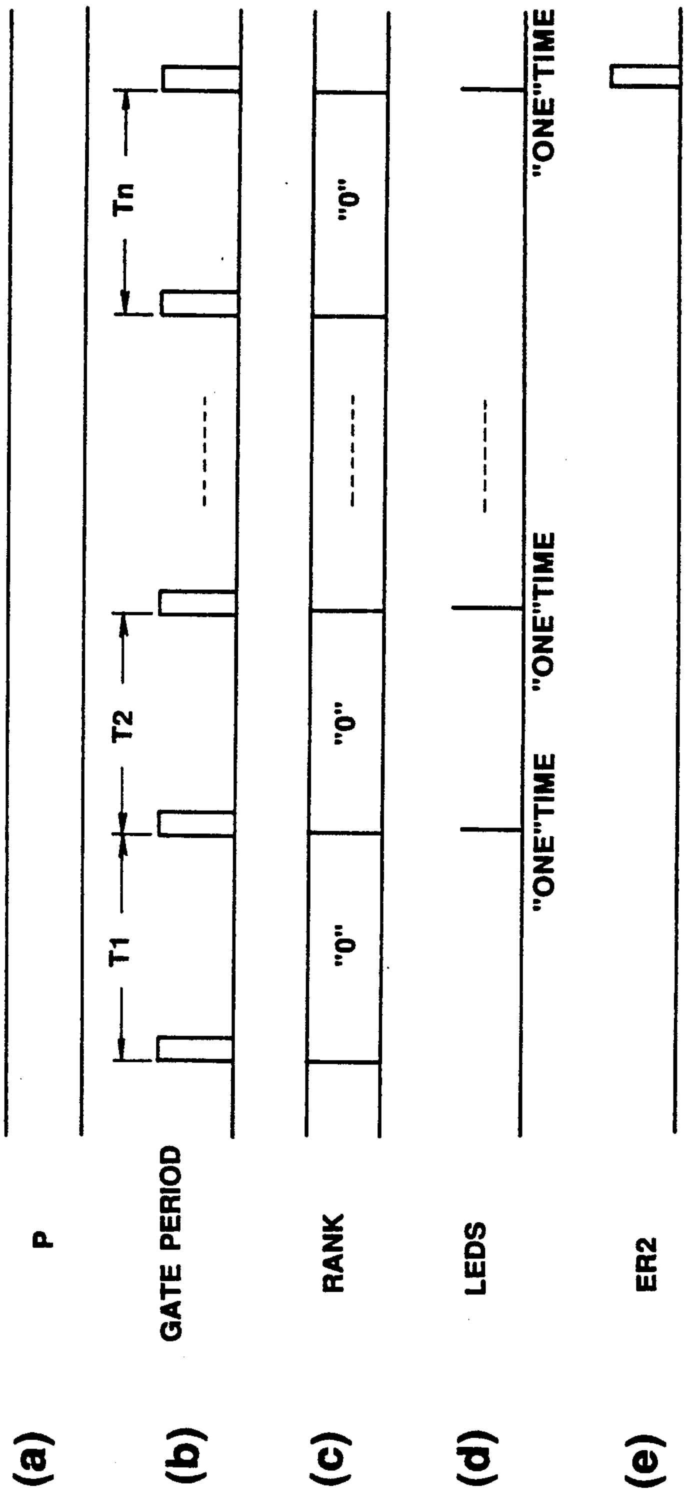
FIG. 18(*a*) to 18 (*e*) are time charts explaining an example of detecting a trouble in the confirmation mode.
Figure 19:
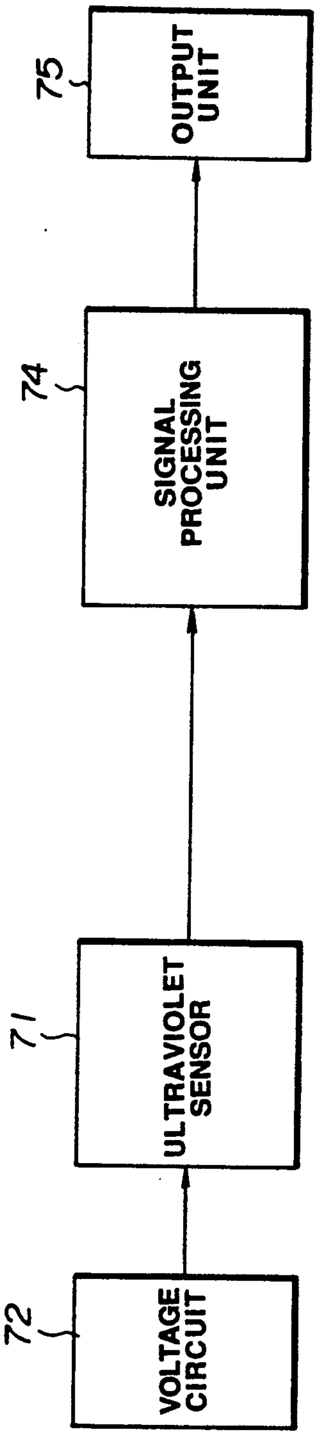
FIG. 19 is a block diagram of the conventional flame detecting apparatus.

FIG. 17, (*a*) to (*d*) are time charts illustrating in detail an example of detecting the sensitivity in the confirmation mode, and FIG. 18, (*a*) to (*e*) are time charts illustrating in detail an example of the detecting trouble in the confirmation mode.

When the specified quantity of ultraviolet rays from the standard light source 50 are incident on the ultraviolet sensor 1 and discharge pulses P are output from the ultraviolet sensor 1 as shown in FIG. 17 (*a*), the number PN of discharge pulses P are counted for each gate period T1, T2, and Tm in the counting section 28 of the sensitivity rank detection section 32, as shown in FIG. 17(*b*). Based on the counted number PN of discharge pulses, the sensitivity rank discrimination section 29 determines the sensitivity rank. For example, as shown in FIG. 17(*c*), when the number PN of discharge pulses is proportional to the quantity of the ultraviolet rays, and the sensitivity of the ultraviolet sensor 1 is normal for gate period T1, the sensitivity rank is determined, for example, to be "2". Also, when the number P of discharge pulses is less than the specified value and the sensitivity of the ultraviolet sensor 1 is lowered for gate period T2, the sensitivity rank is judged, for example, to be "1". While, when the number PN of discharge pulses is less than a certain value (ex."0") and the sensitivity of the ultraviolet sensor 1 is considerably lowered for gate period Tm, the sensitivity rank is judged, for example, to be "0".

After the sensitivity rank has been determined for each gate period T1, T2, . . . and Tm in the sensitivity rank discrimination section 29, as shown in FIG. 17(*c*), each sensitivity rank is coded and sent to the output unit 4 as a sensitivity rank signal LK. When the sensitivity rank signal LK is sent, the output unit 4 displays the corresponding sensitivity rank. For example, as shown in FIG. 17(*d*), when the display output section 43 of the output unit 4 is composed of LEDs, and when the sensitivity rank is "2" (which represents the normal state), the LEDs are not lit. When the sensitivity rank is "1" and the sensitivity is lowered, the LEDs are lit two times, and when the sensitivity rank is "0" and the sensitivity is remarkably lowered, the LEDs are lit one time. When LEDs are lit two times or one time, the operator can make adjustments so that the LEDs are not lit by operating the adjustment section 10 of the sensitivity adjustment unit 2 to change the applied voltage V of the ultraviolet sensor 1. Thus, inspection and testing of sensitivity ranks can be easily performed, and the sensitivity can easily be adjusted by the operator.

Also, even when the specified quantity of ultraviolet rays from the standard light source 50 are incident on the ultraviolet sensor 1 and no discharge pulse is output from the ultraviolet sensor 1 as shown in FIG. 18(*a*), and when the number PN of discharge pulses P is counted as less than a certain value (ex."0") for each gate period T1, T2, . . . and Tn as shown in FIG. 8(*b*), the sensitivity rank discrimination section 29 determines the sensitivity rank to be "0" for each gate period as shown in FIG. 18(*c*). In this case, the sensitivity rank discrimination section 29 sends the sensitivity rank signal LK to the display output section 43 that the sensitivity rank is "0" for each gate period, in which case the LEDs are lit one time as shown in FIG. 18(*d*), and it sends the detection signal D1 to the trouble discrimination section 35. When this detection signal D1 occurs in succession for a specified number of times (for example, n times), the trouble discrimination section 35, sends the trouble signal ER2 to the output unit 4, which outputs it as shown in FIG. 18(*e*). Thus, troubleshooting can easily be performed in a short period of time, for example, 1 minute.

As described above, in the case where the signal processing unit 3 is with a configuration of FIG. 11, the flame detecting apparatus itself has a sensitivity rank discrimination function. Therefore, when this flame detecting apparatus is actually used at the site of installation, inspection or testing can be made in such a way that the operator simply prepares the standard light source 50, operates the switch 40 and switches the operating mode to the confirmation mode, without having to remove the flame detecting apparatus and testing it with another testing device as was done conventionally. The sensitivity of the ultraviolet sensor 1 can be judged with the ultraviolet sensor 1 being integrated into the flame detecting apparatus. In this case, if it is judged that the sensitivity has lowered, the operator needs only to adjust the adjustment section 10 of the sensitivity adjustment unit 2 to modify the sensitivity rank to normal. The adjustment function of the whole apparatus including the ultraviolet sensor 1, sensitivity adjustment unit 2 and the like is provided in the flame detecting apparatus itself, and adjustment, inspection and testing of the whole flame detecting apparatus can be performed simply and accurately.

Furthermore, the flame detecting apparatus of the present invention has a troubleshooting function in addition to a sensitivity rank discrimination function which enables the operator to adjust, inspect, test and diagnosis the whole flame detecting apparatus simply and accurately with a simple tool (standard light source 50) at the site of installation.

Similarly, the whole flame detecting apparatus can also be adjusted quickly and accurately and can be tested simply and accurately at the assembly and manufacturing site as well as at the installation site, having been assembled as a product, simply by preparing the standard light source 50 and by operating only the switch 40.

Moreover, after inspection, testing and the like have been conducted in the confirmation mode with the switch 40 set to ON, the flame detecting operation can be started again just by setting the switch 40 to OFF. Also, when the operator forgets to set the switch 40 to OFF, the apparatus remains in the confirmation mode. However, the apparatus of the present invention has another function that sets the switch 40 to OFF automatically through the control of the switch control section 41 when a specified time elapses after the switch 40 has been set to ON, preventing the apparatus from remaining in the confirmation mode, and allowing the flame detecting operation to be started again after confirmation.

In the above embodiment, the flame detecting mode and the confirmation mode are each provided separately. However, it is also possible to configure these two modes such that the confirmation mode is incorporated into the flame detecting mode. That is, as can be seen from FIG. 11, the flame detecting section 31 and sensitivity rank detection section 32 almost have the same configuration. Therefore, by incorporating the function of the sensitivity rank discrimination section 29 into the flame discrimination section 27 of the flame detecting section 31, flame detection and sensitivity rank discrimination ca be executed simultaneously in the flame discrimination section 27. In this case, the switching selection section 33 is not needed, and switching between the flame detection mode and the confirmation mode is done according to whether or not ultraviolet rays from the standard light source 50 are incident on the ultraviolet sensor 1. Therefore, when the operator sets the confirmation mode so that the ultraviolet rays from the standard light source 50 are incident onto the ultraviolet sensor 1, the whole of the apparatus can be adjusted, inspected, tested and diagnosed based on the results of the sensitivity rank discrimination from the flame discrimination section 27. When ultraviolet rays from the standard light source 50 are not incident on the ultraviolet sensor 1, the flame discrimination section 27 functions as a normal flame discriminator.

In the above embodiment, the operator adjusts the sensitivity based on the discrimination result of the sensitivity rank by adjusting the adjustment section 10 of the sensitivity adjustment unit 2. However, it is also possible to configure it in such a way that when the discrimination result of the sensitivity rank is sent to the adjustment section 10, the voltage is automatically adjusted, in other words, it is possible to automatically adjust the sensitivity. This alleviates the burdens placed on the operator required for adjustment, inspection, testing and diagnosis. Further, if the standard light source 50 is incorporated into the flame detecting apparatus itself and can be turned ON/OFF with a switch or the like, alleviating the work of adjustment, inspection, test and diagnosis much more.

In the above embodiment, an ultraviolet sensor is employed, but sensors other than an ultraviolet sensor can also be employed as the sensor for detecting flame. Also, the type of the signal to be processed in the signal processing unit 3 does not need to be limited to pulses. Other types of signals can also be processed. In this case, the counter value is counted as the accumulated value of signals in a broader sense.

What is claimed is:

1. A flame detecting apparatus comprising: an accumulating means for dividing a time base into several time spans, each having a specified time interval, and for accumulating detection pulse signals output from a sensor for each span, and a calculation means for judging the occurrence of a flame by taking into consideration the accumulated values of previous spans, as well as the accumulated value of the latest span found by the accumulating means, wherein the calculation means calculates the accumulated values in respective ones of a plurality "i" of overlapping spane "$m_i$" numbered consecutively, with each higher numbered span having a longer time interval which includes the time intervals of lower numbered spans and the span latest in time being numbered one, and a flame occurrence being detected based upon comparing each of the accumulated values for the numbered spans with their respectively assigned weightings as threshold levels which are successively higher for higher numbered spans, whereby said flame detecting apparatus is capable of detecting different types of flames which may produce different accumulated values of sensor pulse signals over different time intervals.

2. A flame detecting apparatus according to claim 1, wherein the value of "i" is three or more.

3. A flame detecting apparatus according to claim 1, wherein each time span has a time interval less than a total of 15 seconds.

4. A flame detecting apparatus comprising: an accumulating means for accumulating signals output from a sensor, a time counting means for counting the time that that elapses from the time that said accumulating means starts accumulating, a span setting means for setting a specified time span corresponding to each one of predetermined threshold levels which are pre-set for the accumulated values of the signals, and a calculation means for comparing the time counted by said time counting means, when the accumulated value reaches a certain threshold level, with the time span corresponding to the threshold level, and judging whether a flame has occurred based on the comparison result.

5. A flame detecting apparatus according to claim 4, wherein when the accumulated value reaches a certain threshold level, said calculation means judges that flame has occurred if the time counted by said time counting means is less than the time span corresponding to the threshold level.

6. A flame detecting apparatus comprising: a sensor which detects rays radiated from a flame and outputs a series of pulse signals based upon a setting of a prescribed sensitivity to the detected rays, a signal processing means for detecting the occurrence of a flame and for determining the sensitivity of said sensor based on the number of signals for a specified time of output from said sensor, and output means for outputting sensitivity discrimination results of said signal processing means, and an adjustment means for adjusting the sensitivity of said sensor based on the sensitivity discrimination results output from said output means.

7. A flame detecting apparatus according to claim 6, wherein said signal processing means includes a flame detecting means for detecting a flame based on the number of signals for a specified time output from said sensor, a sensitivity discrimination means for determining the sensitivity of said sensor based on the number of signals for a specified time output from said sensor, and a switching means for selecting or switching between said flame detecting means and the sensitivity discrimination means, such that said switching means selects or switches to the flame detecting means after a specified length of time has elapsed from the selection of the sensitivity means.

8. A flame detecting apparatus according to claim 6, wherein said signal processing means comprises a flame detecting means for detecting flame based on the number of signals per a specified time output from said sensor, and said flame detecting means is configured so that it can determine the sensitivity besides detecting flame.

9. A flame detecting apparatus according to claim 6, wherein said signal processing means determines a trouble of the apparatus when, according to the results of determining the sensitivity of the sensor based on the number of signals per a specified time output from the sensor, the sensitivity is found to be extremely low and when this condition continues for a specified length of time.

* * * * *